W. Fields,
Refining Iron & Steel.

No. 103,437. Patented May 24, 1870.

Witnesses.
J. H. Eldridge
G. W. Daugherty

Inventor.
William Fields

UNITED STATES PATENT OFFICE.

WILLIAM FIELDS, OF WILMINGTON, DELAWARE.

IMPROVEMENT IN FURNACES FOR TREATING CAST-IRON TO CONVERT THE SAME INTO IRON AND STEEL.

Specification forming part of Letters Patent No. 103,437, dated May 24, 1870.

*To all whom it may concern:*

Be it known that I, WILLIAM FIELDS, of the city of Wilmington, in the county of New Castle and State of Delaware, have invented a new and Improved Reverberating Furnace; and I do hereby declare that the following is a full, clear, and exact description of the construction and operation of the same, reference being had to the annexed drawings, making a part of this specification, in which—

Figure 1:
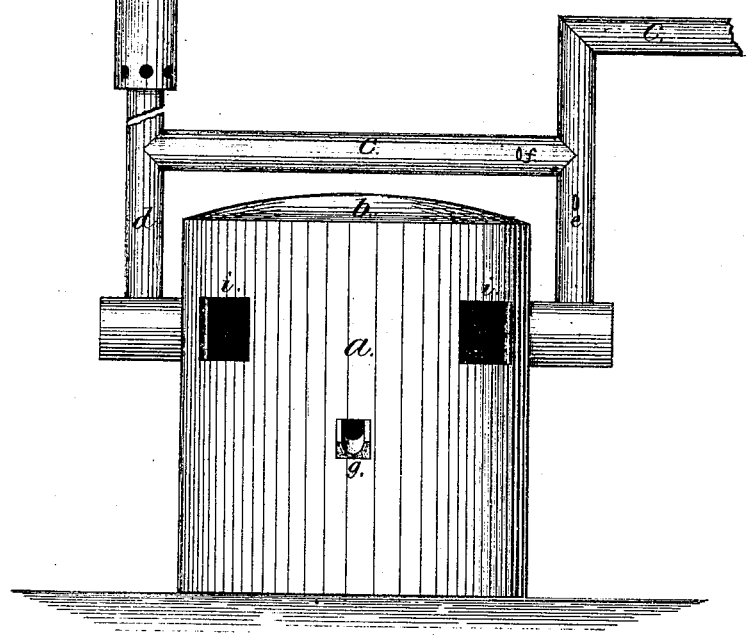
Figure 2:
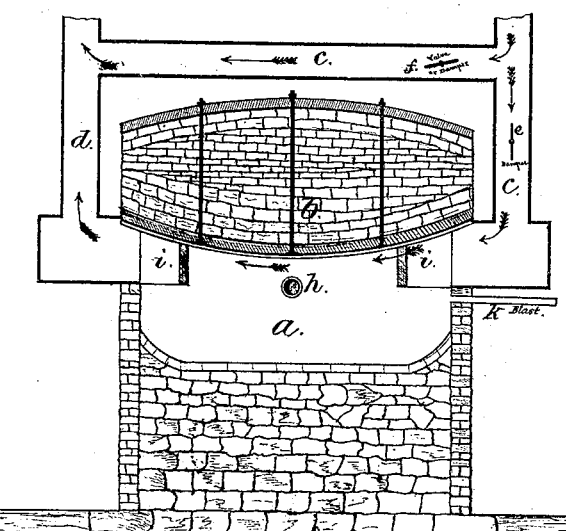

Figure 1 is a front elevation, and Fig. 2 a vertical central section.

Nature and Objects of the Invention.

My invention consists of a furnace, to be used as an adjunct to a cupola or blast-furnace, for treating crude iron as it is run from the cupola as melted cast-iron, or from the blast-furnace as it is reduced directly from the pig-iron, for the purpose of purifying the same and converting it into wrought-iron or steel by my process of refining crude iron and converting it into steel.

This furnace is a reverberatory one, constructed of any convenient dimensions or form, into which the molten iron may be run by suitable troughs or conductors, using a special fire-chamber attached to the furnace with blast, for the purpose of preserving the necessary degree of heat, or by the use of the gases conveyed from the tunnel-head of the blast-furnace by suitable conduits constructed for that purpose, which gases are to be ignited by atmospheric air introduced at the point where the current of gas enters the furnace.

This furnace is to be constructed with any convenient number of rabble or work holes (doors) for the purpose of thoroughly stirring the molten iron and completely working into it the chemicals used.

The crown or roof of this furnace consists of an inverted arch, fastened and sustained by vertical and transverse rods or other suitable devices.

General Description.

*a* is the body of the furnace. *b* is the crown or roof. *c c* are the pipes for conveying the gases to be ignited for maintaining the heat. *d* is the stack of the furnace. *e* is the valve to shut off the heat and gas from the main furnace or cupola. *f* is the valve which shuts off the gas from the stack when it is needed in the furnace. *g* is the tap-hole for running off the metal. *h* is the opening for running the metal into the furnace from the cupola or blast-furnace. *i i* are the doors for stirring the metal; and *k* is the blast-pipe.

What I claim as my invention is—

1. The employment of the pipes, substantially as and for the purposes set forth.

2. The inverted crown or roof, substantially as and for the purposes described.

3. The combination of the pipes, valves, and doors with the inverted arched crown, substantially as and for the purposes set forth.

4. The use or employment of the furnace, as hereinabove described, for the purpose of manufacturing iron, ordinary steel, and cast-steel from the ore or pig-iron.

WILLIAM FIELDS.

Witnesses:
LEVI C. BOOKES,
CHARLES A. WIGGINS.